United States Patent [19]

Okada

[11] Patent Number: 5,016,989
[45] Date of Patent: May 21, 1991

[54] LIQUID CRYSTAL ELEMENT WITH IMPROVED CONTRAST AND BRIGHTNESS

[75] Inventor: Shinjiro Okada, Hiratsuka, Japan

[73] Assignee: Canon Kabushiki Kaisha, Tokyo, Japan

[21] Appl. No.: 593,350

[22] Filed: Oct. 3, 1990

Related U.S. Application Data

[63] Continuation of Ser. No. 245,299, Sep. 16, 1988, abandoned.

[30] Foreign Application Priority Data

Sep. 18, 1987 [JP] Japan ................................ 62-234034
Sep. 19, 1987 [JP] Japan ................................ 62-235990

[51] Int. Cl.$^5$ ............................................. G02F 1/13
[52] U.S. Cl. .................................. 350/350 S; 350/337
[58] Field of Search ...................... 350/337, 341, 350 S

[56] References Cited

U.S. PATENT DOCUMENTS

| | | | |
|---|---|---|---|
| 4,563,059 | 1/1986 | Clark et al. | 350/350 S X |
| 4,586,791 | 5/1986 | Isogai et al. | 350/341 |
| 4,634,228 | 1/1987 | Iwasaki et al. | 350/341 |
| 4,709,994 | 12/1987 | Kanbe et al. | 350/341 X |
| 4,712,873 | 12/1987 | Kanbe et al. | 350/337 |
| 4,796,979 | 1/1989 | Tsuboyama | 350/350 S |
| 4,832,462 | 5/1989 | Clark et al. | 350/350 S |

Primary Examiner—Stanley D. Miller
Assistant Examiner—Huy K. Mai
Attorney, Agent, or Firm—Fitzpatrick, Cella, Harper & Scinto

[57] ABSTRACT

A liquid crystal element comprises (a) two electrode substrates, (b) a ferroelectric liquid crystal disposed between said two electrode substrates having an orientation state for producing a relationship of $Is_1 > Is_2$ (where $Is_1$ is the amount of transmission light produced without voltage application after setting crossed nicols in the darkest state during no voltage application after the application of a voltage of one polarity which is greater than the threshold voltage between the electrodes, and the subsequent application of a voltage of another polarity which is greater than the threshold voltage between the electrodes, and $Is_2$ is the amount of transmission light produced without voltage application after setting corssed nicols in the darkest state during no voltage application after the application of a voltage of another polarity which is greater than the threshold voltage between the electrodes, and the subsequent application of a voltage of one polarity which is greater than the threshold voltage between the electrodes) and (c) polarizers consisting of crossed nicols set so that a dark state is produced without voltage application after the application of said voltage of another polarity more than the threshold voltage between the electrodes.

15 Claims, 5 Drawing Sheets

LIQUID CRYSTAL ELEMENT WITH IMPROVED CONTRAST AND BRIGHTNESS

This application is a continuation of application Ser. No. 245,299, filed Sept. 16, 1988, now abandoned.

BACKGROUND OF THE INVENTION

1. Field of the Invention

This invention relates to a ferroelectric liquid crystal element, and more particularly to a nonspirally-aligned ferroelectric liquid crystal element producing two different orientation states when no electric field is applied.

2. Description of the Prior Art

N. A. Clark et al. have disclosed (for example, in U.S. Pat. No. 4,367,924 and U.S. Pat. No. 4,563,059) the production of a liquid crystal element capable of two different stable orientation states (bistability) when no electric field is applied so as to provide a memory capability by disposing a ferroelectric smectic liquid crystal (chiral smectic C or H liquid crystal) producing a spiral alignment structure in bulk state between a substrate spacing which is small enough to suppress the spiral alignment structure thereof.

N. A. Clark et al. use the application of magnetic field or shearing in order to realize the above-described bistable orientation state, but it is more practical to use rubbing or oblique evaporation processing as an orientation processing procedure. A liquid crystal element in which rubbing or oblique evaporation processing has been utilized in order to realize a bistable orientation state having a monodomain has been disclosed, for example, by S. Okada et al. in U.S. Pat. No. 4,639,089.

However, ferroelectric smectic liquid crystal having a bistable orientation state with a monodomain realized by rubbing or oblique evaporation processing has a disadvantage that the amount of transmission light under memory state is less that of N. A. Clark et al.

Accordingly, the present inventor has investigated the possibility of realizing a novel bistable orientation state which produces the same degree of optical modulation effect produced from a bistable orientation state as that realized by N. A. Clark et al. by adopting more practical rubbing or oblique evaporation processing as an orientation processing means.

SUMMARY OF THE INVENTION

It is an object of the present invention to provide a ferroelectric liquid crystal element having a bistable orientation state which can perform a display with improved contrast.

It is another object of the present invention to provide a ferroelectric liquid crystal having a bistable orientation state which can perform a display with both an improved contrast and brightness.

The present invention provides these feature and others by a liquid crystal element comprising (a) two electrode substrates, (b) a ferroelectric liquid crystal disposed between said two electrode substrates having an orientation state for producing a relationship of $I_{S1} > I_{S2}$ (where $I_{S1}$ is the amount of transmission light produced without voltage application after setting crossed nicols in the darkest state during no voltage application after the application of a voltage of one polarity which is greater than the threshold voltage between the electrodes, and the subsequent application of a voltage of another polarity which is greater than the threshold voltage between the electrodes, and $I_{S2}$ is the amount of transmission light produced without voltage application after setting crossed nicols in the darkest state during no voltage application after the application of a voltage of another polarity which is greater than the threshold voltage between the electrodes, and the subsequent application of a voltage of one polarity which is greater than the threshold voltage between the electrodes) and (c) polarizers consisting of crossed nicols set so that a dark state is produced without voltage application after the application of said voltage of another polarity more than the threshold voltage between the electrodes. Especially, for achieving improved brightness, the present invention can use polarizers consisting of crossed nicols, the absorption axes of one or both of which are set by shifting from the disposition of the crossed nicols producing the darkest state on the occasion of no voltage application by an angle $O_A$.

DETAILED DESCRIPTION OF THE INVENTION

In a bistable orientation state of the present invention, angles (pretilt angles) of the long axes (directors) of molecules of smectic liquid crystal with regard to the substrate plane are different under two different orientation states.

FIGS. 1(A) and (B) graphically illustrate the states of smectic liquid crystal molecules under a bistable orientation state of the present invention.

Figure 1:
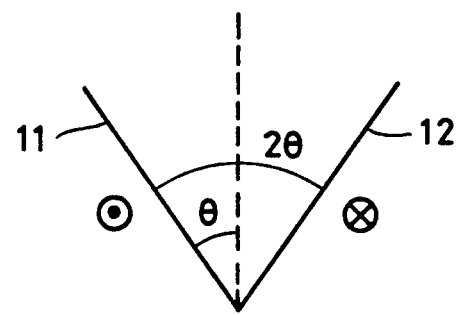
FIG. 1(A) is a plan view graphically illustrating an orientation state of a liquid crystal of the present invention.
FIG. 1(B) is a cross-sectional view thereof.
Figure 1:
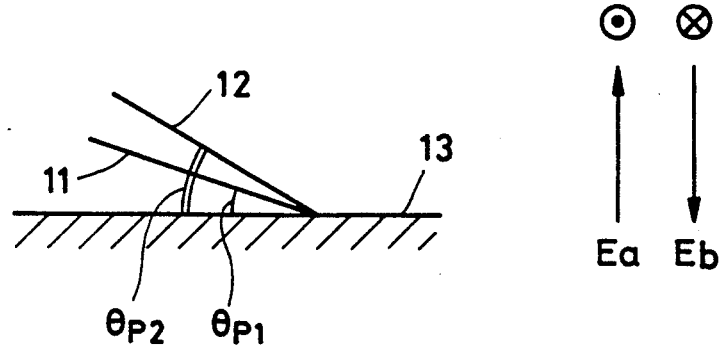

In FIG. 1, there are shown directors 11 and 12 under two different orientation states. The director 11 is a director when no voltage is applied after a vertical electric field (shown by   ) not smaller than the threshold voltage passing upward from the side beneath the paper plane which corresponds to the substrate plane 13 has been applied, and the director 12 is a director when no voltage is applied after an electric field (shown by   ) in the reverse direction of that described above has been applied. A pretilt angle $O_{p1}$ of the director 11 with regard to the substrate plane 13 is smaller than a pretilt angle $O_{p2}$ of the director 12 with regard to the substrate plane 13. Arrows in FIG. 1(B) indicate the directions of electric fields    and   .

Accordingly, when an electric field $E_a$ greater than the threshold voltage in the direction of    is applied to the liquid crystal under this bistable orientation state, the director of the liquid crystal molecules is oriented to the director 11 as illustrated, and when an electric field $E_b$ greater than the threshold voltage in the direction of is applied, the director of the liquid crystal molecules is oriented from the director 11 illustrated to the director 12 with an angle $2\theta$ which is twice the tilt angle $\theta$. The orientation state in which the director becomes 11 and the orientation state in which the director becomes 12 are optically identified by a couple of polarizers consisting of crossed nicols.

Under such an orientation state, the amount of transmission light (I) is generally represented by the following formula.

$$I = I_0 \sin^2(4\theta) \cdot \sin^2\left(\pi \frac{\Delta n d}{\lambda}\right), \quad (1)$$

where $\theta$ is the inclination of the long axis of molecule from the normal of the layer organized by smectic liquid crystal molecules: tilt angle, $\Delta$ n is anisotropy in refractive index, d is the thickness of the cell, $\lambda$ is the specific wave length, and $I_0$ is the amount of incident light.

In the formula (1), the value of $\Delta$ n largely depends on the amount of the pretilt angle of the liquid crystal molecules. When the inclination between the direction of the optical axis and the direction of the progress of light is designated $\theta_0$, the following formula holds approximately, $$I = I_0 \sin^2(4\theta)\sin^2\left(\pi \cdot \frac{\Delta n \cdot \sin^2\theta_0 \cdot d}{\lambda}\right). \quad (2)$$

When liquid crystal molecules parallel to the substrate plane, $\theta_0 = \pi/2$, and so $$\Delta n \cdot \sin^2 \frac{\pi}{2} = \Delta n;$$

i.e., the smaller the pretilt angle is, the larger the amount of transmission light I. In the present invention, however, $\theta_0 \neq \pi/2$, which means that the pretilt angle $\theta_{p1}$ of the director 11 and the pretilt angle $\theta_{p2}$ of the director 12 are different, so that the amount of transmission light is different for each orientation state.

Figure 2:
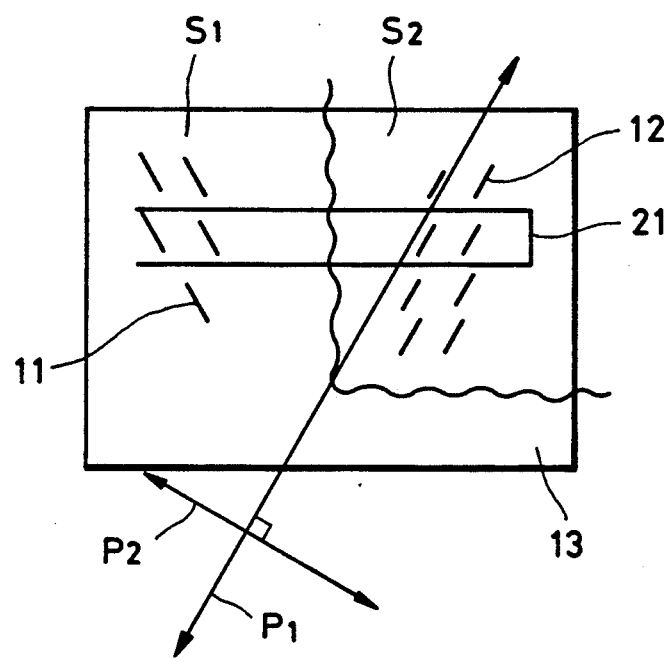
FIG. 2 is a plan view illustrating a disposition between a bistable orientation state and absorption axes of polarizers.

FIG. 2 represents a plan view of a disposition between a bistable orientation state and absorption axes of polarizers.

The liquid crystal element in FIG. 2 sets the absorption axis of crossed nicols to the one in which the amount of transmission light is set larger, between an amount of transmission light $I_{S2}$ of the orientation state $S_2$ when an absorption axis of crossed nicols is set in the average direction of the long axes of molecules under the orientation state $S_1$ and an amount of transmission light $I_{S1}$ of the orientation state $S_1$ when an absorption axis of crossed nicols is set in the average direction of the long axes of molecules under the orientation state $S_2$.

In FIG. 2, vertical molecule layer 21 is organized by a layer of plural smectic liquid crystal molecules organized perpendicularly to the substrate plane 13, in which an orientation state $S_1$ of domains oriented in the direction of the director 11 and an orientation state $S_2$ of domains oriented in the direction of the director 12 are formed.

In the present embodiment, the darkest state is produced when the average direction of molecular axes of the orientation state $S_2$ having a large pretilt angle $\theta_{p2}$ coincide with the absorption axis $P_1$ of one polarizer of 90° crossed nicols (the absorption axis $P_2$ of another polarizer). At this moment, a large amount of transmission light can be obtained when an orientation state $S_1$ having a small pretilt angle $O_{p1}$ is produced by the application of electric field.

It will be noted that in the present embodiment, the absorption axis $P_2$ is preferably set within an angle range no larger than ±5° more than the average direction of molecular axes of the orientation state $S_2$.

In the above-described ferroelectric liquid crystal element having a bistable orientation state, two electrode substrates are used on which uniaxial orientation control films formed by obliquely evaporating silicon oxides (SiO, SiO$_2$) are provided. The incident angle to two electrode substrate planes at evaporation is 5°-20°, and the uniaxial orientation axes formed by oblique evaporation (wherein the directions of incident angles to said two electrode substrates are in nonparallel reverse directions to one another) having a crossing angle set within a range of 1°-20°. Further, in a more preferred example, by changing one of the incident angles during the oblique evaporation process obliquely evaporated coating layers formed on the two, the difference between the pretilt angle $\theta_{p1}$ of the director 11 and the pretilt angle $\theta_{p2}$ of the director 12 can be made large.

As a ferroelectric smectic liquid crystal used in the present invention, one which produces a cholesteric phase at a higher temperature range is preferable. One such liquid crystal is described in U.S. Pat. No. 4,639,089. In the present embodiment, "CS-1014" (product name) of Chisso Corp. has been used as this type of liquid crystal.

EXAMPLE 1

Figure 4:
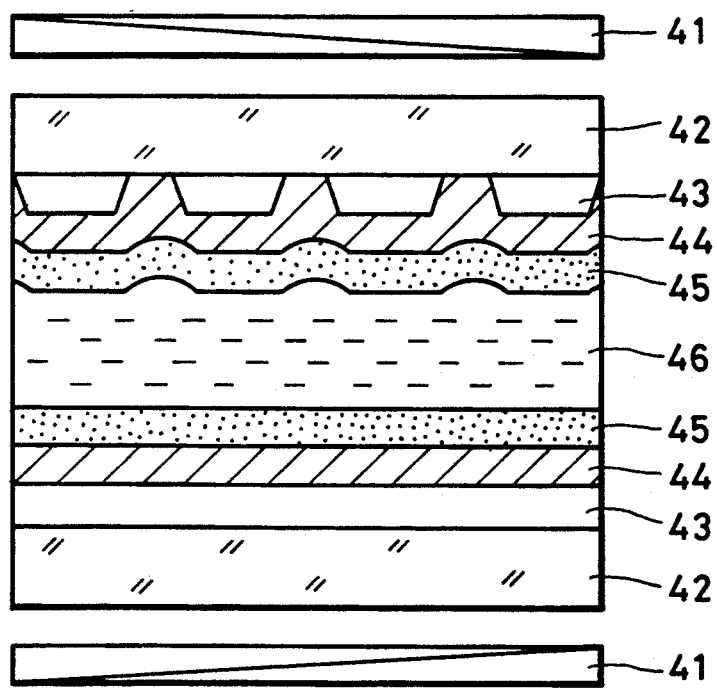
FIG. 4 is a cross-sectional view of a liquid crystal of the present invention.

A ferroelectric liquid crystal element shown in FIG. 4 was prepared. A transparent electrode 43 consisting of ITO (Indium-Tin-Oxide) film and SiO$_2$ 550Å thick as an insulating film 44 were formed by sputtering on a glass substrate 42. An orientation control film 45 consisting of obliquely evaporated SiO 1000Å thick was formed thereon having an incident angle of 10° from the plane of one glass substrate (upper substrate), and an orientation control film 45 consisting of obliquely evaporated SiO 1000Å thick was formed with an inverse incident angle of 8° from the plane of another glass substrate (lower substrate) on the respective glass substrate 42. At this moment, the axis of the orientation control film formed on the upper substrate crossed the axis of the orientation control film formed on the lower substrate at an angle of about 3°. The oblique evaporation at this moment was performed under conditions of $2 \times 10^{-6}$ Torr and 12Å/s. As a liquid crystal 46, "CS-1014" (product name) of Chisso Corp. which produces a cholesteric phase at a high temperature range was used, and the spacing between the substrate 42 was set 1.0 μm.

Figure 3:
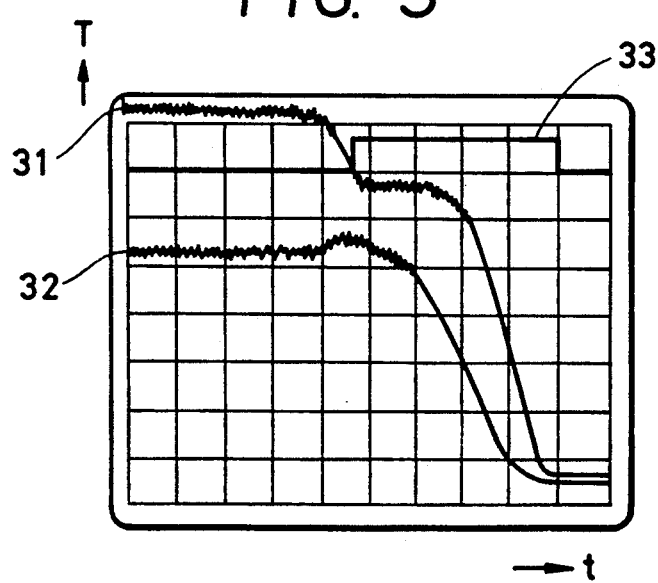
FIG. 3 is a characteristic diagram illustrating electrooptical response effects of the present invention and a comparative example.

With this liquid crystal element, the variation of the amount of transmission light under the orientation state $S_1$ when the absorption axis $P_1$ of the polarizer 41 was adjusted to the average direction of the long axes of molecules of the orientation state $S_2$ was measured under the following conditions, and the electrooptical response effect shown as 31 in FIG. 3 was obtained. The liquid crystal element with such a disposition of crossed nicols produced a large contrast.

[METHOD OF MEASUREMENT]

Figure 5:
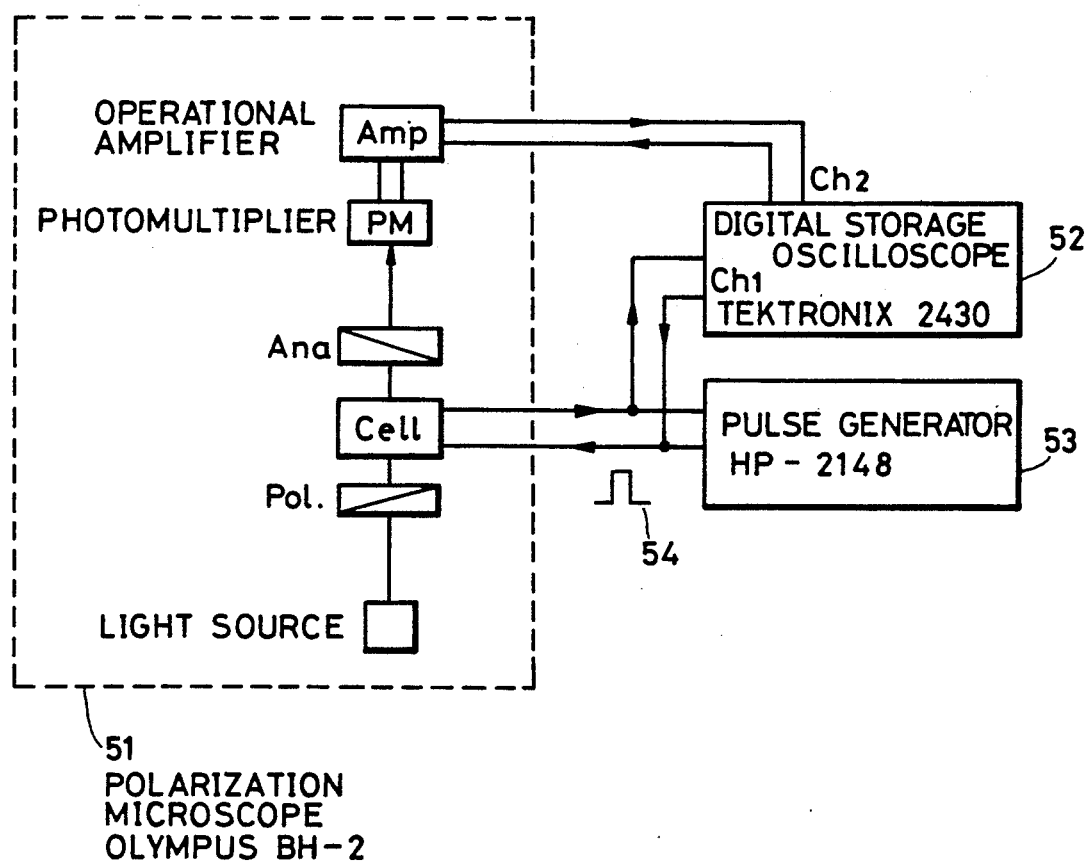
FIG. 5 is a block diagram of a device used when electrooptical response effects have been measured.

By using an apparatus shown in FIG. 5 the results shown in FIG. 3 were obtained. In FIG. 5, there are shown a polarization microscope 51 which is "OLYMPUS BH-2" (product name) of Olympus Optical Co., a digital storage oscilloscope 52 which is "TEKTRONIX 2430" (product name) of Tektronix Corp. of U.S.A., and a pulse generator 53 which is "HP-214B" (product name) of Hewlett-Packard Corp. of U.S.A.

The input conditions of a pulse 54 were 0.2 ms/Div. and 20 V/Div.

[COMPARATIVE EXAMPLE 1]

In the liquid crystal element used in Example 1, the variation in the amount of transmission light under the orientation state $S_2$ when the absorption axis $P_1$ of the polarizer was adjusted to the average direction of the long axes of molecules under the orientation state $S_1$ was measured, and the electrooptical response effect shown as 32 in FIG. 3 was obtained. A liquid crystal element with such a disposition of crossed nicols had a lower contrast compared to that of Example 1. In FIG. 3, the abscissa is time t, and the ordinate is transmittance T (arbitrary unit), and there is also shown the wave form of the applied voltage 33.

In a preferred example of the present invention, an improved brightness characteristic can be obtained by changing the disposition from the darkest disposition (wherein the average direction of the axes of liquid crystal molecules under the orientation state $S_2$ and the absorption axis $P_1$ of one of the crossed nicoles coincide) to a disposition wherein the absorption axis $P_1$ is rotated either clockwise or counterclockwise by an angle $\theta_A$ the absolute value of which is not greater than 20° and is preferably 5°-15°.

Figure 6:
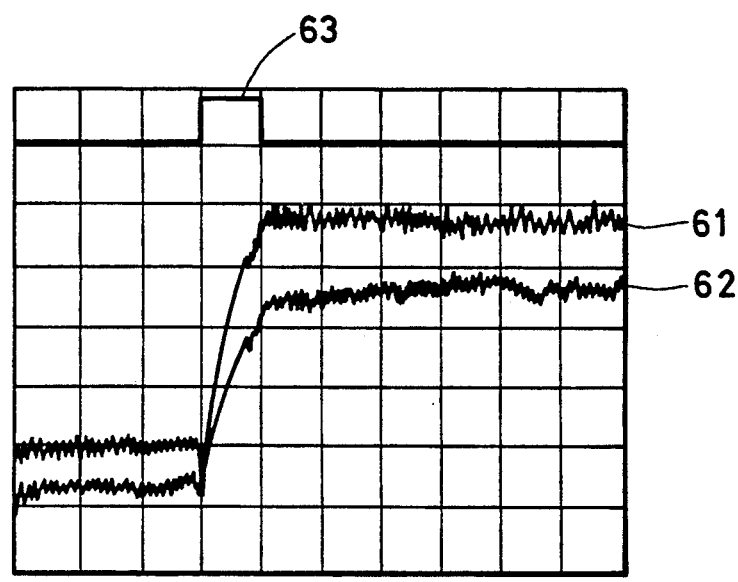
FIG. 6 is a characteristic diagram illustrating electrooptical response effects of another embodiment of the present invention and a comparative example.

FIG. 6 is a diagram for explaining a liquid crystal element of the present invention, in which there is shown a result 62 according to Comparative Example 2: the result obtained when the variation in the amount of transmission light under the orientation state $S_1$ accompanying switching on the occasion of selecting the orientation state $S_1$ having a large amount of transmission light (the absorption axis $P_1$ is set by taking the axes of molecules under the orientation state $S_2$ as a standard) was measured.

There is also shown a result 61 according to a second Example of the present invention: the result obtained when the variation in the amount of transmission light under the orientation state $S_1$ when the positions of the polarizers $P_1$ and $P_2$ aligned to the axes of molecules under the orientation state $S_2$ of Comparative Example 2 are respectively shifted clockwise by 10°.

As shown in FIG. 6, the electrooptical response effect 62 has larger contrast between light and dark states. However, even if the dark state becomes more or less lighter than the electrooptical response effect 62 by shifting the polarizers $P_1$ and $P_2$, the light state can be formed lighter at the same time, so that the difference in the amount of transmission light between the light and dark states is nearly constant from the moment the polarizer has not been shifted yet. Nevertheless, the total amount of transmission light has increased so that, judged as a display picture, the difference between light and dark states is large, i.e., contrast is good, while at the same time the total picture becomes brighter, so that background white becomes even whiter, resulting in an easier observation of characters.

There is also shown in FIG. 6 the wave form 63 of the applied voltage.

Accordingly, in the present invention, contrast in a display picture under display driving can be largely improved, and moreover, a display picture having a higher brightness can be formed.

What is claimed is:

1. A liquid crystal element comprising:
   (a) two electrode substrates;
   (b) a chiral smectic liquid crystal disposed between said two electrode substrates having orientation states with a relationship $Is_1 > Is_2$, where $Is_1$ is an amount of light transmitted during no voltage application after (1) setting two polarizers in the darkest state during no voltage application after the application of a voltage of one polarity greater than threshold voltage between the electrodes, and (2) the subsequent application and interruption of a voltage of another polarity greater than the threshold voltage between the electrodes, and $Is_2$ is an amount of light transmitted during no voltage application after (1) setting two polarizers in the darkest state during no voltage application after the application of a voltage of another polarity greater than the threshold voltage between the electrodes, and (2) the subsequent application and interruption of a voltage of one polarity greater than the threshold voltage between the electrodes; and
   (c) two polarizers set in said dark state produced during no voltage application after the application of said voltage of another polarity greater than the threshold voltage between the electrodes, said polarizers being disposed having said pair of substrates thereinbetween.

2. A liquid crystal element according to claim 1 wherein an absorption axis of one of said polarizers is within an angle range of about ±5° from an absorption axis of crossed nicols for producing the darkest state.

3. A liquid crystal element according to claim 1 wherein a pretilt angle $Op_1$ under a first orientation state for producing the amount of transmission light $Is_1$ is smaller than a pretilt angle $Op_2$ under a second orientation state for producing the amount of transmission light $Is_2$.

4. A liquid crystal element according to claim 1 wherein said two electrode substrates have uniaxial orientation control films of obliquely evaporated silicon oxide.

5. A liquid crystal element according to claim 4 wherein the incident angle of evaporation of said silicon oxide on said two substrates is from 5°-20°, and the directions of said incident angles to the two electrode substrates are reverse to one another.

6. A liquid crystal element according to claim 5 wherein said directions are nonparallel.

7. A liquid crystal element according to claim 6 wherein said directions cross at an angle of 1°-20°.

8. A liquid crystal element comprising:
   (a) two electrode substrates;
   (b) a chiral smectic liquid crystal disposed between said two electrode substrates having orientation states with a relationship $Is_1 > Is_2$, where $Is_1$ is an amount of light transmitted during no voltage application (1) setting two polarizers in the darkest state during no voltage application after the application of a voltage of one polarity greater than the threshold voltage between the electrodes, and (2) the subsequent application and interruption of a voltage of another polarity greater than the threshold voltage between the electrodes, and $I_{S2}$ is an amount of light transmitted during no voltage application after (1) setting two polarizers in the darkest state during no voltage application after the application of a voltage of another polarity greater than the threshold voltage between the electrodes, and (2) the subsequent application and interruption of a voltage of one polarity greater than the threshold voltage between the electrodes; and (c) two polarizers set such that an absorption axis of at least one polarizer is shifted by an angle $\theta_A$ from a disposition of said two polarizers producing the darkest state during no voltage applications after the application of said voltage of another polarity greater than the threshold voltage between the electrodes, said polarizers being disposed having said pair of substrates therein between.

9. A liquid crystal element according to claim 8 wherein $-20° \leq \theta_A \leq 20°$ with the proviso that $\theta_A \neq 0°$.

10. A liquid crystal element according to claim 8 wherein $|\theta_A| = 5°-15°$.

11. A liquid crystal element according to claim 8 wherein a pretilt angle $\theta_{p1}$ of the orientation state producing the amount of transmission light $I_{S1}$ is smaller than a pretilt angle $\theta_{p2}$ of the orientation state producing the amount of transmission light $I_{S2}$.

12. A liquid crystal element according to claim 8 wherein said two electrode substrates have uniaxial orientation control films of obliquely evaporated silicon oxide.

13. A liquid crystal element according to claim 12 wherein the incident angle of evaporation of said silicon oxide on said two substrates is from 5°-20°, in the directions of said incident angles to the two electrode substrates are reverse to one another.

14. A liquid crystal element according to claim 13 wherein said directions are non-parallel.

15. A liquid crystal element according to claim 14 wherein said directions cross at an angle of 1°-20°.

* * * * *